US010201913B2

(12) United States Patent
McNeilus et al.

(10) Patent No.: US 10,201,913 B2
(45) Date of Patent: Feb. 12, 2019

(54) MODULAR MOUNT FOR TRANSIT CONCRETE MIXER

(71) Applicant: CON-TECH MANUFACTURING INC., Dodge Center, MN (US)

(72) Inventors: Garwin B. McNeilus, Dodge Center, MN (US); Grant McNeilus, Dodge Center, MN (US); Brian R. Meldahl, Brownsdale, MN (US); Tracy L. Schrafel, West Concord, MN (US)

(73) Assignee: Con-Tech Manufacturing Inc., Dodge Center, MN (US)

( * ) Notice: Subject to any disclaimer, the term of this patent is extended or adjusted under 35 U.S.C. 154(b) by 410 days.

(21) Appl. No.: 14/310,088

(22) Filed: Jun. 20, 2014

(65) Prior Publication Data

US 2015/0367300 A1 Dec. 24, 2015

(51) Int. Cl.

| | |
|---|---|
| ***B01F 13/00*** | (2006.01) |
| ***B01F 15/02*** | (2006.01) |
| ***B01F 9/00*** | (2006.01) |
| ***B01F 15/00*** | (2006.01) |
| ***B28C 5/42*** | (2006.01) |
| ***B60P 3/16*** | (2006.01) |

(52) U.S. Cl.

CPC .............. *B28C 5/4265* (2013.01); *B60P 3/16* (2013.01); *Y10T 29/49004* (2015.01)

(58) Field of Classification Search

CPC ....... B28C 5/4265; B28C 5/42; B28C 5/4213; B28C 5/4217; B28C 5/4234; B28C 5/4255; B60P 3/16; B60K 25/00; B62D 65/04

USPC ........................................................ 366/2, 62

See application file for complete search history.

(56) References Cited

U.S. PATENT DOCUMENTS 3,190,621 A * 6/1965 Green .................. B28C 5/4272 366/61
2010/0246313 A1* 9/2010 Ruf ...................... B28C 5/4265 366/63

* cited by examiner

*Primary Examiner* — Tony G Soohoo
*Assistant Examiner* — Elizabeth Insler

(57) ABSTRACT

A vehicle mountable, self-contained independent transit concrete mixer operating system is provided in two pre-assembled modular parts for mounting on a truck chassis. The system needs only power take-off, electrical and control system connections to be operable.

12 Claims, 7 Drawing Sheets

40
42
52
54
56
46
48
44
50

MODULAR MOUNT FOR TRANSIT CONCRETE MIXER

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention

The present invention relates generally to transit systems for mixing and dispensing concrete and, more particularly, to a self-contained modular vehicle-mounted system in which pre-assembled front and rear modular assemblies that are self-contained and need only electrical power and control connections and a mechanical power take-off connection are mounted as units on a chassis and simply connected such that the system is ready to receive a mixing drum in a very short time.

II. Related Art

Transit concrete mixing and dispensing vehicles have been in use for many years. They typically include a cab for the operator, and a rotatable drum behind the cab for containing and mixing concrete ingredients and dispensing mixed concrete at a job site. The rotatable drum is mounted for rotation between front and rear assemblies which are constructed in situ on separately supplied trucks with structural rear chassis members. The assembly takes several days while the front and rear arrangement assemblies are constructed item-by-item in place on the chassis. It would present a great manufacturing advantage if pre-assembled modular front and rear units could be mounted on a chassis and simply connected to existing vehicle 12-volt electric electrical control and mechanical power take-off connections.

SUMMARY OF THE INVENTION

By means of the present invention, there is provided a vehicle-mountable, self-contained independent transit concrete mixer operating system for carrying and operating a transit concrete mixing drum mounted on a vehicle chassis in two pre-assembled modular units. They include a pre-assembled front modular unit that includes a drum supporting structure for supporting a first end of a concrete mixing drum, a drum drive assembly, including a self-contained hydraulic system comprising a hydraulic fluid reservoir and hydraulic pump for supplying hydraulic fluid to operate the system, spaced support members for carrying and mounting said front modular unit on a truck chassis and an assembled rear modular mixer assembly that includes a drum supporting structure for supporting a second end of a concrete mixing drum, a charge hopper for receiving materials to be mixed, a discharge chute arrangement for off-loading mixed concrete and an associated access ladder arrangement, spaced support members for carrying and mounting said rear modular unit on a truck chassis.

Each of said front and rear modular units are self-contained such that they need only be mounted on a truck chassis and connected to utility and control systems in the truck to be operable. The hydraulic pump is designed to connect to a power take-off shaft and the system needs only an electric battery connection and control system connections. The control system is mounted in the truck cab and has sensor and electrical control connections to the mixer operating system.

BRIEF DESCRIPTION OF THE DRAWINGS

In the drawings wherein like numerals designate like parts.

DETAILED DESCRIPTION

In accordance with the detailed description of the present invention, particular embodiments illustrated and described are meant to present examples of the invention and not as limiting factors with respect to the scope of the inventive concepts as it is believed that variations on the theme may occur to those skilled in the art which remain well within the confines of the inventive concepts.

Figure 1:
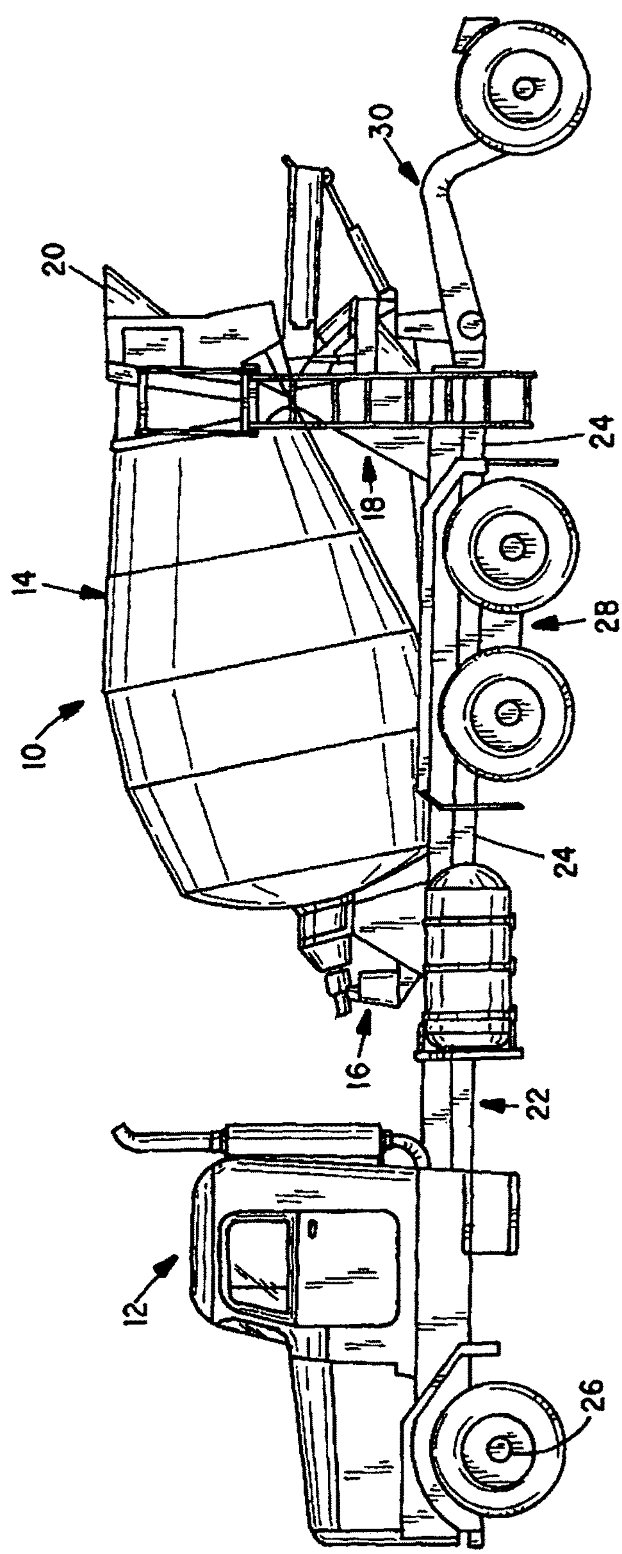
FIG. 1 depicts an assembled transit concrete mixer vehicle of a class for which the modular mounting system of the invention is well suited.

FIG. 1 depicts a typical assembled transit concrete mixer truck of a class which can utilize the present invention. The truck shown generally at 10 includes a cab 12 and a mixing drum 14 mounted behind the cab. The mixing drum is mounted for rotation between the pedestal of an assembled front assembly 16 and the pedestal of a rear assembly 18. A charging hopper is shown at 20. The front and rear assemblies are mounted on the vehicle chassis 22 having a pair of spaced parallel main members or frame rails, one of which is shown at 24 and which extend along the length of the vehicle 10. A steering axle is shown at 26 and a dual axle drive wheel arrangement is shown at 28. An auxiliary axle is shown deployed at 30.

Figure 2A:
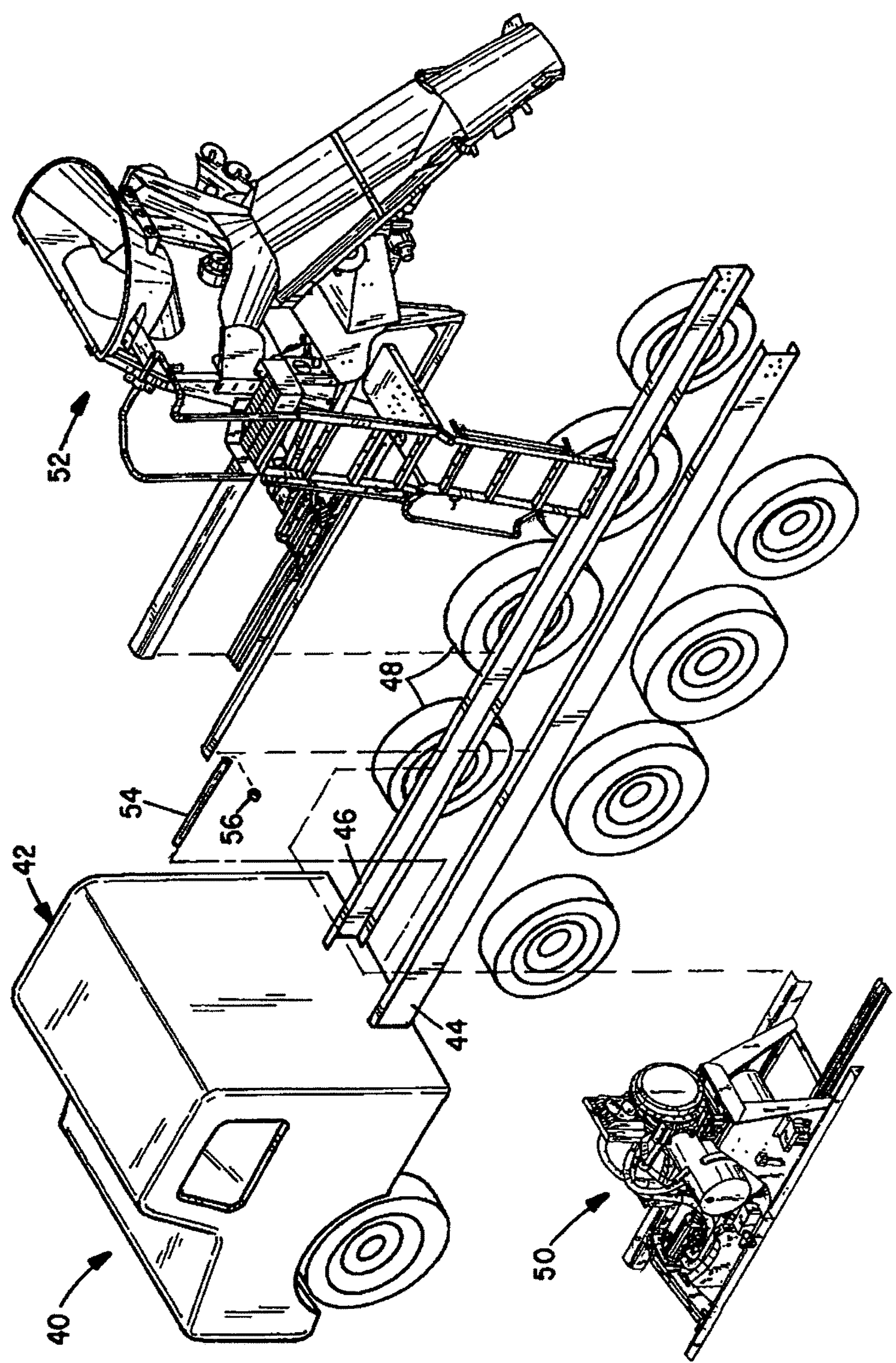
FIG. 2A is a schematic drawing of a truck with a front modular mixer assembly and rear modular mixer assembly ready for mounting.
Figure 2B:
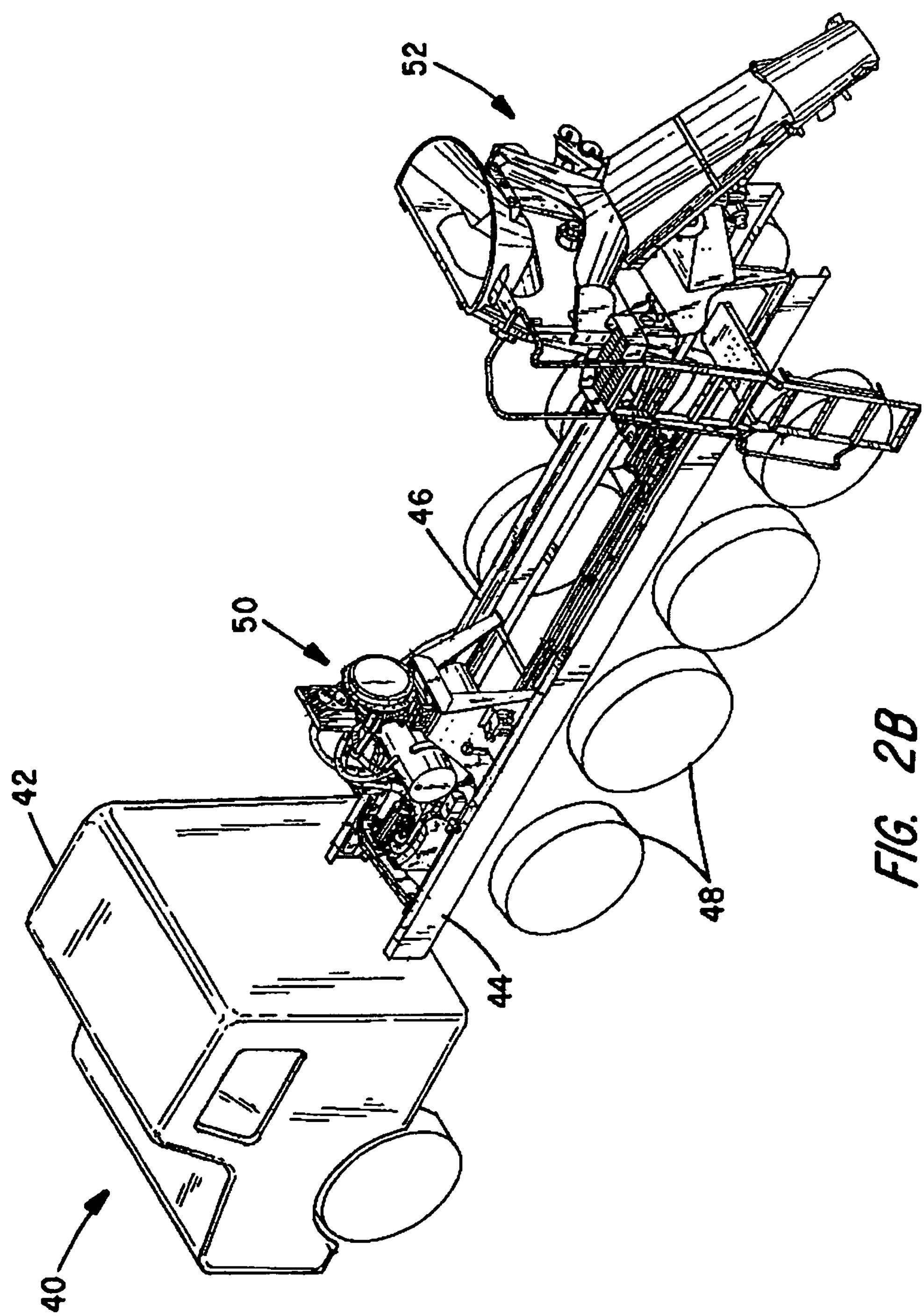
FIG. 2B shows the parts of FIG. 2A assembled in place.

FIG. 2A is a schematic representation of a vehicle with a modular mixer front assembly and a modular mixer rear assembly as pre-assembled for placement on the vehicle. The vehicle shown generally at 40 includes a cab 42 and a pair of spaced parallel main longitudinal rail members 44 and 46, which are opposed heavy channel shapes joined by spaced structural cross members (not shown). A plurality of wheels are shown at 48. An assembled modular mixer front unit is shown at 50 and an assembled modular mixer rear unit is depicted at 52. A drive shaft 54 and U-joint 56 are also shown. FIG. 2B is a schematic representation of the units of FIG. 2A assembled and mounted on the vehicle.

Figure 3A:
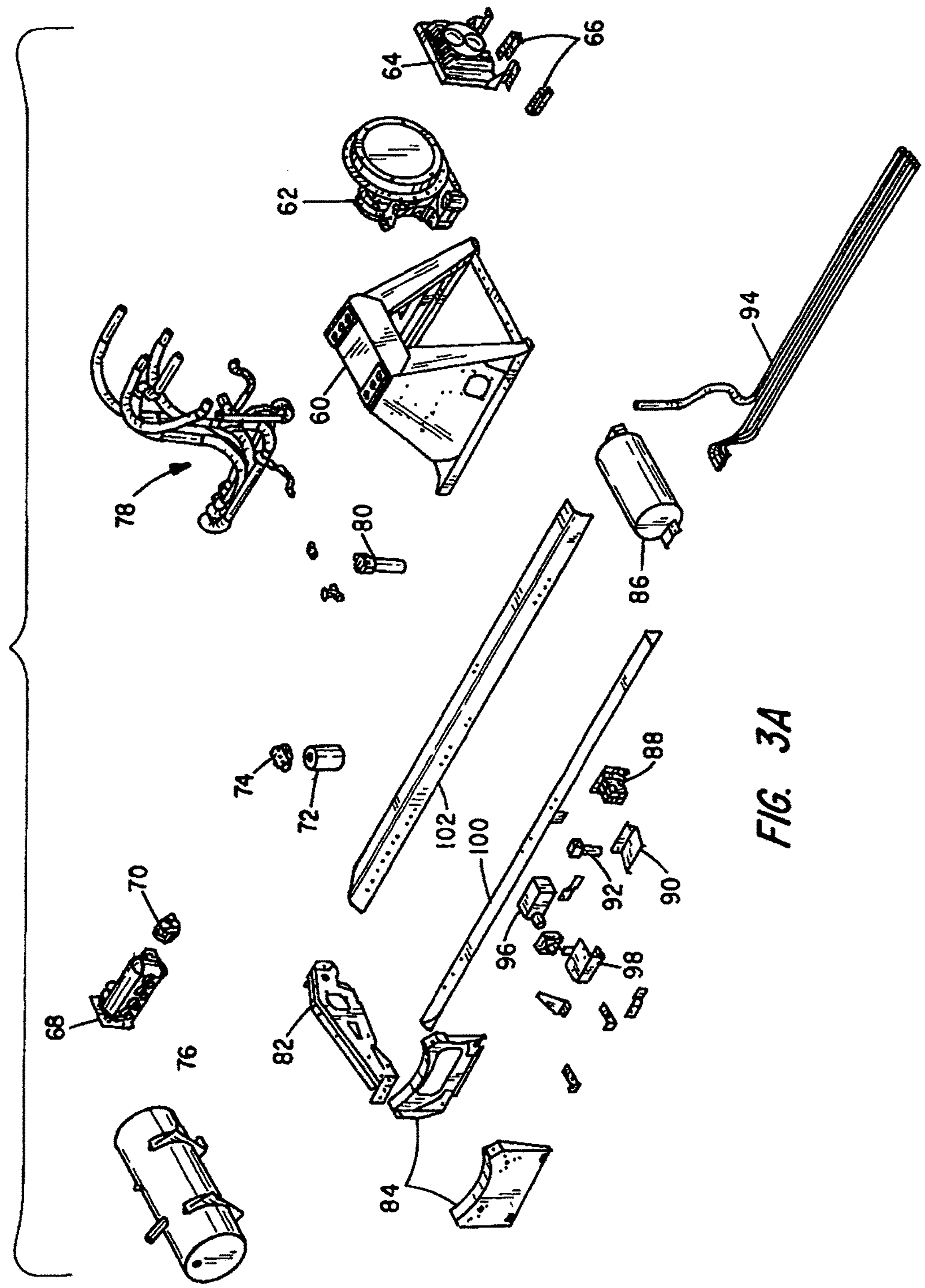
FIGS. 3A and 3B depict an exploded view and an assembled view of a front modular mixer assembly.

FIG. 3A is an exploded view of parts of a front unit 50 prior to assembly and includes a front pedestal structure 60, hydraulic motor drum drive 62, which may be a ZF drive with cooling fan 64 and fan spacers 66. The drum drive 62 mounts on the pedestal 60 and is adapted to receive the front drum mount. The drum drive is operated by a self-contained hydraulic system that includes a main hydraulic pump 68; an auxiliary pump 70 is provided as is a low pressure filter 72 and filter housing 74. A hydraulic fluid supply tank is shown at 76; a hydraulic hose harness is shown at 78 and a high pressure filter is shown at 80. A mounting assembly for the main hydraulic pump 68 is shown at 82. Thus, the hydraulic system of the mounted mixer is self-contained and needs only a power take-off connection to be ready to operate.

Water tank saddles 84 are provided to carry an on-board water tank (not shown). An air accumulator tank is shown at 86 and an associated MAC pneumatic solenoid valve is shown at 88 with valve cover 90, associated air filter 92 and air hose harness 94, A hydraulic combo block is shown at 96 with bracket 98. The pneumatic system needs only a high pressure air hose connection to be ready to operate.

Figure 3B:
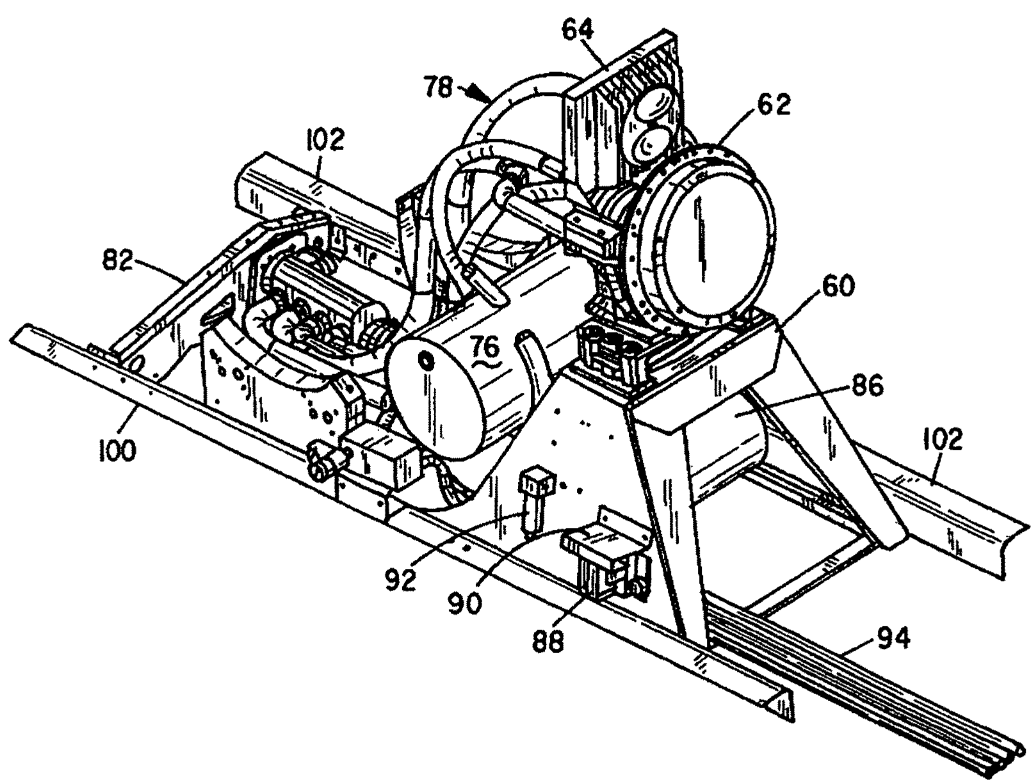

Mounting rails are depicted at 100 and 102. FIG. 3B shows the front modular unit assembled on the rails prior to being mounted as a pre-assembled unit on a transit mixer chassis. The pre-assembled unit 50 needs only to have the pump 68 connected to a power take-off, electrical battery and control conductor connectors, an air hose connection and the water tank added. This takes only a short time compared to building the unit in situ.

Figure 4A:
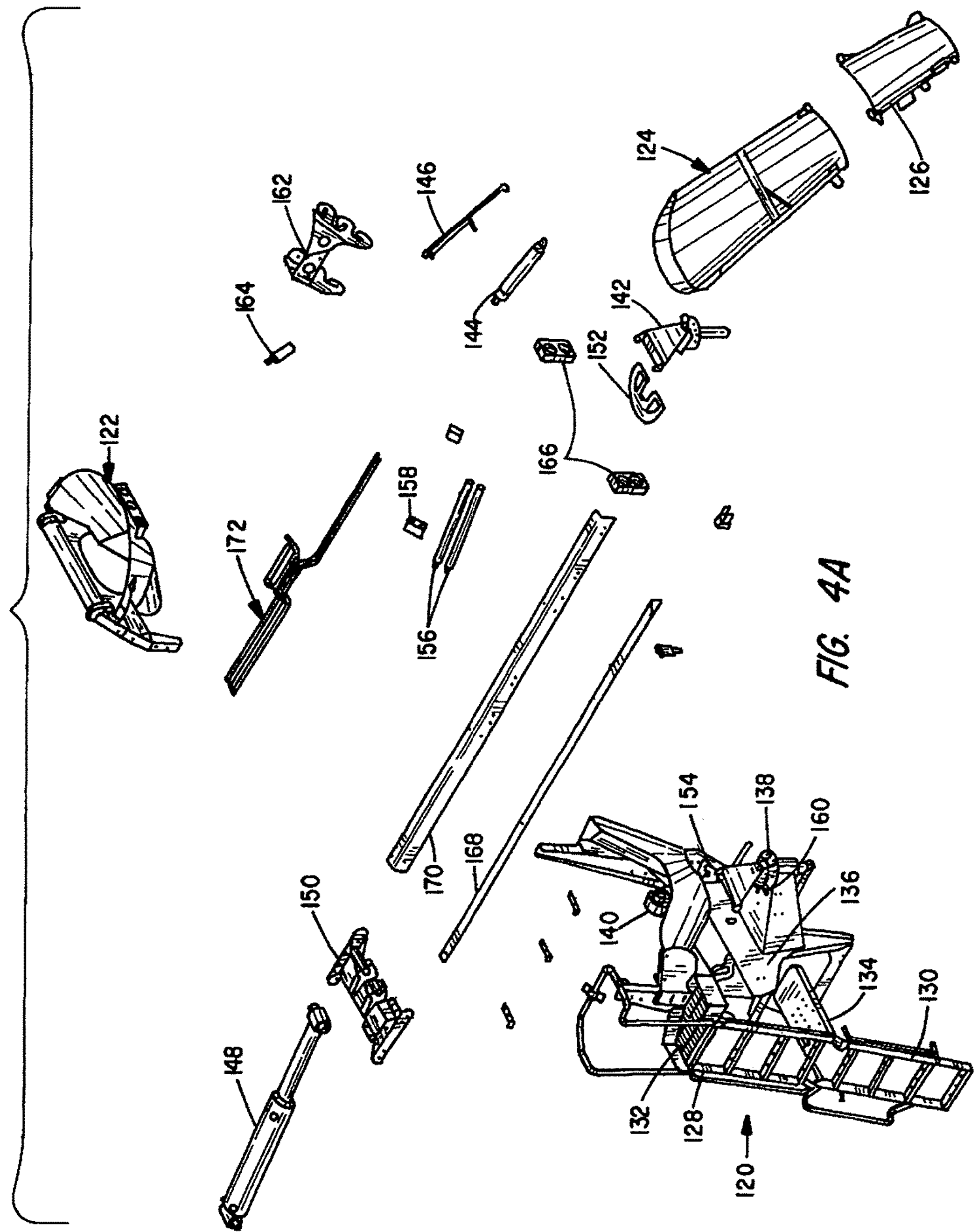
FIGS. 4A and 4B depict an exploded view and an assembled view of a rear modular mixer assembly.

An exploded view of the rear unit is depicted in FIG. 4A and includes an access ladder assembly, generally at 120, a charge hopper 122 and a discharge chute that includes a main chute 124 and a fold-over chute 126. The ladder assembly has upper and lower ladder sections 128 and 130, respectively, and upper and lower platforms 132 and 134. A rear chute pedestal is shown at 136 with chute lock 138. A heavy rear drum support roller is shown at 140. A chute pivot member is provided at 142 with chute cylinder 144 and chute base 146. A bridgeking hydraulic cylinder is pictured at 148 with mount 150. A chute brake system includes a plate shown at 152, a brake latch 154, hoses 156 and valve 158. A manual chute lock 160 is also provided. The unit also includes a chute rack 162 and hopper cylinder 164. Taillight brackets 166 are included. As with the front modular unit, the modular assembly is mounted on a pair of spaced parallel rails 168 and 170.

Figure 4B:
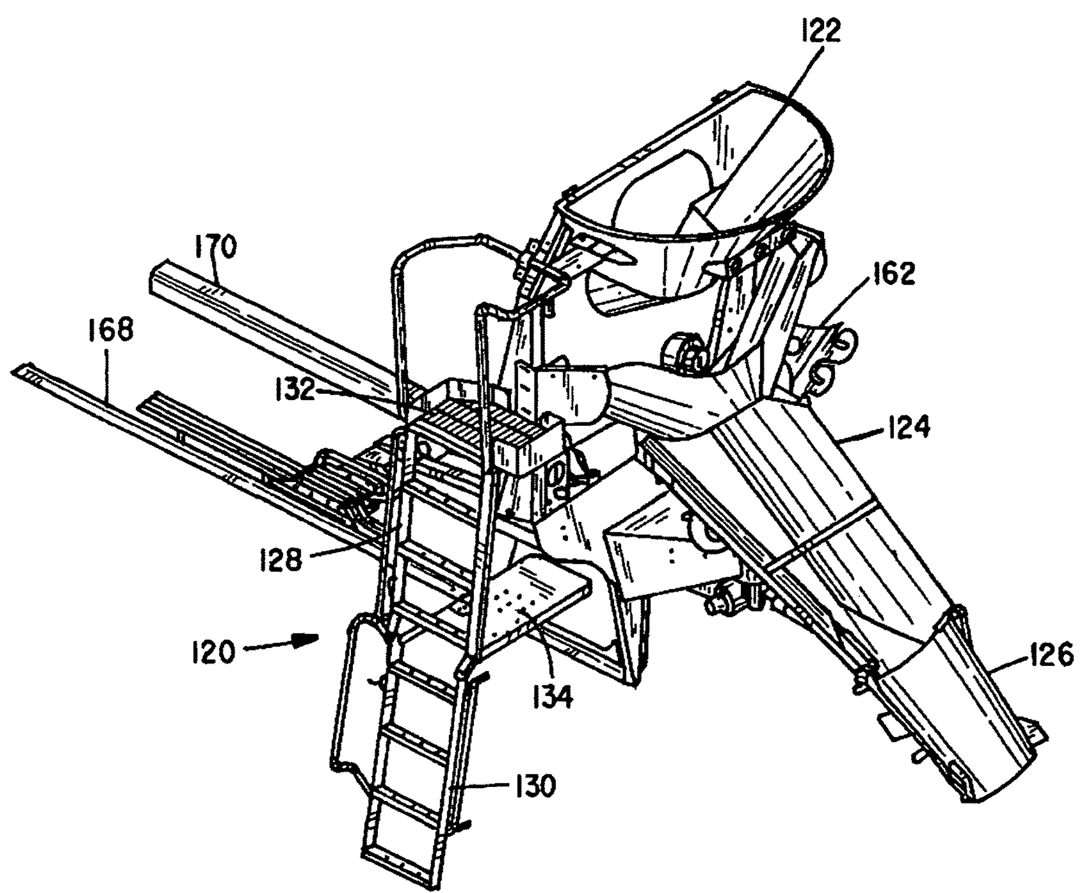

FIGS. 4A and 4B depict the assembled rear unit assembled on rails and ready to be mounted on the truck chassis behind the front unit. The pre-assembled rear unit 52, once mounted, needs only hydraulic and air through hoses and electrical connections thereafter.

Once the front unit 50 and rear unit 52 are mounted and connections made, the mixing drum can readily be dropped into place.

In the manner of the present invention, front and rear modular units can be completely constructed in advance and simply mounted as units on chassis frames in a short time. The units are far easier to construct in this manner than they are if constructed on a chassis initially and this results in a less expensive and more efficient method of assembling a transit concrete mixing vehicle.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A method of assembling a vehicle-mounted, self-contained, independent truck-mounted concrete mixer operating system comprising:

a) constructing a completely pre-assembled front modular unit and a completely pre-assembled rear modular unit, wherein the front modular unit comprises a front pedestal supported by a front unit support structure and a drum drive assembly mounted on the front pedestal, wherein the drum drive assembly comprises a drum connection configured to be coupled to a first end of a mixing drum so as to cause rotation of the mixing drum, a power take-off connection configured to be connected to a power take-off of the vehicle so as to provide operating power to the drum drive and a control conductor connector, and, wherein the rear modular unit comprises a rear chute pedestal supported by a rear unit support structure and a rear drum support attached to the rear chute pedestal, with the rear drum support configured to support the mixing drum while also allowing rotation thereof;

b) mounting said front modular unit on a selected truck chassis by mechanically coupling the front support structure to the truck chassis, and mounting said rear modular unit on the selected truck chassis by mechanically coupling the rear unit support structure to the selected truck chassis; and c) connecting the vehicle power take-off to the power take-off connection and connecting the control conductor connector to a control conductor of the vehicle control system, thereby allowing the front modular unit and the rear modular unit to be fully operational.

2. A method as in claim 1 wherein said drum drive of the completely pre-assembled front modular unit further comprises a front drum supporting structure for supporting a first end of a concrete mixing drum, and wherein the drum drive assembly comprises a self-contained hydraulic system comprising a hydraulic fluid reservoir and hydraulic pump for supplying hydraulic fluid to operate the self-contained hydraulic system; and wherein said completely pre-assembled rear modular unit further comprises a charge hopper for receiving materials to be mixed, a discharge chute arrangement for off-loading mixed concrete and an associated access ladder arrangement.

3. The method of claim 1 wherein the front unit support structure is a pair of spaced parallel support rails and the selected truck chassis has a pair of parallel main rail members, and wherein the step of mechanical coupling the front modular unit comprises placing the pair of spaced parallel support rails on the spaced parallel main rail members so they are coalligned and directly adjacent one another.

4. The method of claim 1 wherein the rear unit support structure is a pair of spaced parallel support rails and the selected truck chassis has a pair of parallel main rail members, and wherein the step of mechanical coupling the rear modular unit comprises placing the pair of spaced parallel support rails on the spaced parallel main rail members so they are coalligned and directly adjacent one another.

5. The method of claim 2 wherein the front unit support structure is a pair of spaced parallel support rails and the selected truck chassis has a pair of parallel main rail members, and wherein the step of mechanical coupling the front modular unit comprises placing the pair of spaced parallel support rails on the spaced parallel main rail members so they are coalligned and directly adjacent one another.

6. The method of claim 2 wherein the rear unit support structure is a pair of spaced parallel support rails and the selected truck chassis has a pair of parallel main rail members, and wherein the step of mechanical coupling the rear modular unit comprises placing the pair of spaced parallel support rails on the spaced parallel main rail members so they are coalligned and directly adjacent one another.

7. A method of assembling a vehicle-mounted, self-contained, independent truck-mounted concrete mixer operating system and mounting said operating system to a vehicle chassis, the method comprising:

constructing a completely pre-assembled front modular unit and a completely pre-assembled rear modular unit, with the completely pre-assembled front modular unit comprising all hydraulic and electrical components necessary for operation thereof and a front unit support structure which supports all components of the front modular unit, and the completely pre-assembled rear modular unit comprising all hydraulic and electrical components necessary for operation thereof and a rear unit support structure which supports all components of the rear modular unit, and wherein the preassembled front modular unit and the preassembled rear modular unit are each transportable as separate units;

positioning said front modular unit on the vehicle chassis at a desired front mounting location and subsequently connecting said front modular unit to the vehicle chassis by coupling the front unit support structure with the truck chassis, and positioning said rear modular unit on the vehicle chassis at a desired rear mounting location and subsequent connecting said rear modular unit to the vehicle chassis by coupling the rear unit support structure with the truck chassis; and connecting a vehicle power take-off to the hydraulic system of the front modular unit, and connecting a control conductor of the vehicle to a control conductor connection of the front modular unit, and completing hydraulic connections, electrical connections and air connections between the rear modular unit and the vehicle, thereby allowing the front modular unit and the rear modular unit to be fully operational.

8. A method as in claim 7 wherein said completely pre-assembled front modular unit further comprises:

a front drum supporting structure for supporting a first end of a concrete mixing drum, a drum drive assembly, including a self-contained hydraulic system comprising a hydraulic fluid reservoir and hydraulic pump for supplying hydraulic fluid to operate the self-contained hydraulic system; and wherein said completely pre-assembled rear modular unit further comprises:

a rear drum supporting structure for supporting a second end of the concrete mixing drum, a charge hopper for receiving materials to be mixed, a discharge chute arrangement for off-loading mixed concrete and an associated access ladder arrangement.

9. The method of claim 8 wherein the rear modular unit further comprises chute cylinder attached to the rear pedestal and the discharge chute, the chute cylinder configured to assist in positioning the discharge chute, and wherein completing the hydraulic connections between the rear pedestal and the vehicle includes coupling-the chute cylinder to the hydraulic system on the vehicle.

10. The method of claim 8 wherein the front unit support structure is a pair of parallel support rails and the rear unit support structure is a pair of parallel support rails.

11. The method of claim 10 wherein the vehicle chassis has a pair of parallel main rail members, and wherein the step of positioning the front modular unit at a desired front mounting location comprises placing the pair of spaced parallel support rails on the parallel main rail members of the vehicle chassis so they are coalligned and directly adjacent therewith, and wherein the step of positioning the rear modular unit at a desired front mounting location comprises placing the pair of spaced parallel support rails on the parallel main rail members of the vehicle chassis so they are coalligned and directly adjacent therewith.

12. A method of assembling a vehicle-mounted, self-contained, independent truck-mounted concrete mixer operating system and mounting said operating system to a vehicle chassis having a pair of parallel main rail members, the method comprising:

constructing a completely pre-assembled front modular unit comprising a pair of parallel spaced front support rails, a front drum supporting structure attached to and supported by the pair of parallel spaced support rails for supporting a first end of a concrete mixing drum, and a drum drive assembly coupled to the front drum supporting structure, the drum drive comprising a self-contained hydraulic system for causing rotation of the concrete mixing drum which comprises a hydraulic motor, a hydraulic fluid reservoir and hydraulic pump for supplying hydraulic fluid to operate the hydraulic motor, wherein the preassembled front modular unit is transportable as a separate unit;

constructing a completely pre-assembled rear modular unit comprising a pair of parallel spaced rear support rails, a rear drum supporting structure attached to the pair of parallel spaced rear support rails for supporting a second end of the concrete mixing drum, a charge hopper for receiving materials to be mixed, a discharge chute arrangement for off-loading mixed concrete and an associated access ladder arrangement wherein the preassembled rear modular unit is transportable as a separate unit;

positioning said front modular unit on the vehicle chassis at a desired front mounting location such that the pair of parallel spaced front support rails are placed upon and coalligned with the pair of parallel main rail members, and subsequently connecting the pair of parallel spaced front support rails and the pair of parallel main rail members to one another;

positioning said rear modular unit on the vehicle chassis at a desired rear mounting location such that the pair of parallel spaced rear support rails are placed upon and coalligned with the pair of parallel main rail members, and subsequently connecting the pair of parallel spaced rear support rails and the pair of parallel main rail members to one another; and connecting a vehicle power take-off to the hydraulic system of the front modular unit, and connecting a control conductor of the vehicle to a control conductor connection of the front modular unit, and completing hydraulic connections, electrical connections and air connections between the rear modular unit and the vehicle, thereby allowing the front modular unit and the rear modular unit to be fully operational.

* * * * *